(12) United States Patent
Yoon

(10) Patent No.: US 10,347,885 B2
(45) Date of Patent: Jul. 9, 2019

(54) BATTERY MODULE

(71) Applicant: SAMSUNG SDI CO., LTD., Yongin-si, Gyeonggi-do (KR)

(72) Inventor: Sung Jin Yoon, Yongin-si (KR)

(73) Assignee: Samsung SDI Co., Ltd., Yongin-Si, Gyeonggi-do (KR)

(*) Notice: Subject to any disclaimer, the term of this patent is extended or adjusted under 35 U.S.C. 154(b) by 401 days.

(21) Appl. No.: 15/234,179

(22) Filed: Aug. 11, 2016

(65) Prior Publication Data
US 2017/0054124 A1 Feb. 23, 2017

(30) Foreign Application Priority Data
Aug. 21, 2015 (KR) .................. 10-2015-0118229

(51) Int. Cl.
H01M 2/10 (2006.01)
H01M 10/613 (2014.01)
H01M 10/625 (2014.01)
H01M 10/6556 (2014.01)
H01M 10/6561 (2014.01)

(52) U.S. Cl.
CPC ..... H01M 2/1077 (2013.01); H01M 10/6556 (2015.04); H01M 10/6561 (2015.04); H01M 10/613 (2015.04); H01M 10/625 (2015.04)

(58) Field of Classification Search
CPC ................... H01M 10/6555; H01M 10/6557
See application file for complete search history.

(56) References Cited

U.S. PATENT DOCUMENTS

| 2012/0040226 A1* | 2/2012 | Kim ..................... | H01M 2/1077 429/120 |
| 2012/0064386 A1* | 3/2012 | Oguri .................. | H01M 2/1016 429/156 |
| 2012/0177952 A1* | 7/2012 | Maguire ............. | H01M 2/1077 429/1 |
| 2013/0202926 A1* | 8/2013 | Yoon .................... | H01M 2/1022 429/82 |
| 2015/0064541 A1* | 3/2015 | Noh ..................... | H01M 2/1061 429/156 |
| 2016/0036018 A1* | 2/2016 | Gunna ................ | H01M 10/625 429/100 |

FOREIGN PATENT DOCUMENTS

| KR | 10-2006-0037605 A | 5/2006 |
| KR | 10-2006-0063174 A | 6/2006 |
| KR | 10-2006-0085775 A | 7/2006 |

* cited by examiner

Primary Examiner — Robert S Carrico
(74) Attorney, Agent, or Firm — Lee & Morse, P.C.

(57) ABSTRACT

A battery module includes a plurality of battery cells arranged in one direction, spacers respectively located among the plurality of battery cells, the spacers including upper end portions and upper flange portions along the upper end portions, a housing accommodating the plurality of battery cells and the spacers, a pair of end plates at respective opposite ends in the arrangement direction of the plurality of battery cells, the pair of end plates being outside of the housing, and a top plate over the plurality of battery cells, the top plate including a lower surface and at least one holding member on the lower surface, the at least one holding member on the lower surface corresponding to at least one holding groove portion in the upper flange portions of the spacers.

11 Claims, 5 Drawing Sheets

BATTERY MODULE

CROSS-REFERENCE TO RELATED APPLICATION

Korean Patent Application No. 10-2015-0118229, filed on Aug. 21, 2015, in the Korean Intellectual Property Office, and entitled: "Battery Module," is incorporated by reference herein in its entirety.

BACKGROUND

1. Field

An aspect of the present disclosure relates to a battery module, and more particularly, to a battery module capable of easily fixing battery cells in a housing.

2. Description of the Related Art

In general, battery cells are used as energy sources for mobile devices, electric vehicles, hybrid vehicles, and the like. The battery cells are used by variously changing their shapes depending on the kind of external device to which the battery cells are applied.

A compact mobile device, e.g., a cellular phone, can be operated with the power and capacity of a single battery cell for a predetermined time. However, when long-time driving and high power driving are required in an electric vehicle or hybrid vehicle which consumes a large amount of power, a large capacity battery module is configured by electrically connecting a plurality of battery cells so as to increase power and capacity. The output voltage or output current of the battery module may be increased according to the number of battery cells built in the battery module.

SUMMARY

According to an aspect of the present disclosure, there is provided a battery module including a plurality of battery cells arranged in one direction, spacers respectively located among the plurality of battery cells, the spacers including upper end portions and upper flange portions along the upper end portions, a housing accommodating the plurality of battery cells and the spacers, a pair of end plates at respective opposite ends in the arrangement direction of the plurality of battery cells, the pair of end plates being outside of the housing, and a top plate over the plurality of battery cells, the top plate including a lower surface and at least one holding member on the lower surface, the at least one holding member on the lower surface corresponding to at least one holding groove portion in the upper flange portions of the spacers.

An upper end portion of at least one spacer may be aligned with a center of the at least one holding groove portion, the at least one holding member including at least one pair of hook members spaced apart from each other, and the upper end portion of the spacer being positioned between the hook members.

The battery module may include at least two pairs of hook members spaced apart from each other at a predetermined distance along the upper end portion of the spacer, the at least two pairs of hook members facing in different directions from each other.

A first pair of the at least two pairs of hook members may face toward a first side surface of the battery cells, and a second pair of the at least two pairs of hook members faces toward a second side surface of the battery cells.

The housing may include side plates surrounding opposite side surfaces of the battery cells, first extending portions extending from two end portions of the side plates in the arrangement direction of the battery cells, and at least one bending portion bending toward upper surfaces of the battery cells.

The at least one bending portion may include an accommodating groove portion at an end portion thereof.

At least one of the end plates may include an upper surface with a protruding portion on the upper surface, the protruding portion corresponding to the accommodating groove portion in the bending portion.

Each of the first extending portions may include at least one first fastening hole.

Each of the end plates may include a body portion facing an end portion of the housing and a second extending portion bending from the body portion to face the first extending portion, the second extending portion including at least one second fastening hole, and the first fastening hole and the second fastening hole being fastened to each other via a fixing member.

The fixing member may be a screw.

Each spacer may include side flange portions surrounding portions of side surfaces of adjacent battery cells.

Each side flange portion may include at least one through-hole to define a flow path between the adjacent battery cells, so that air moves through the through-hole.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
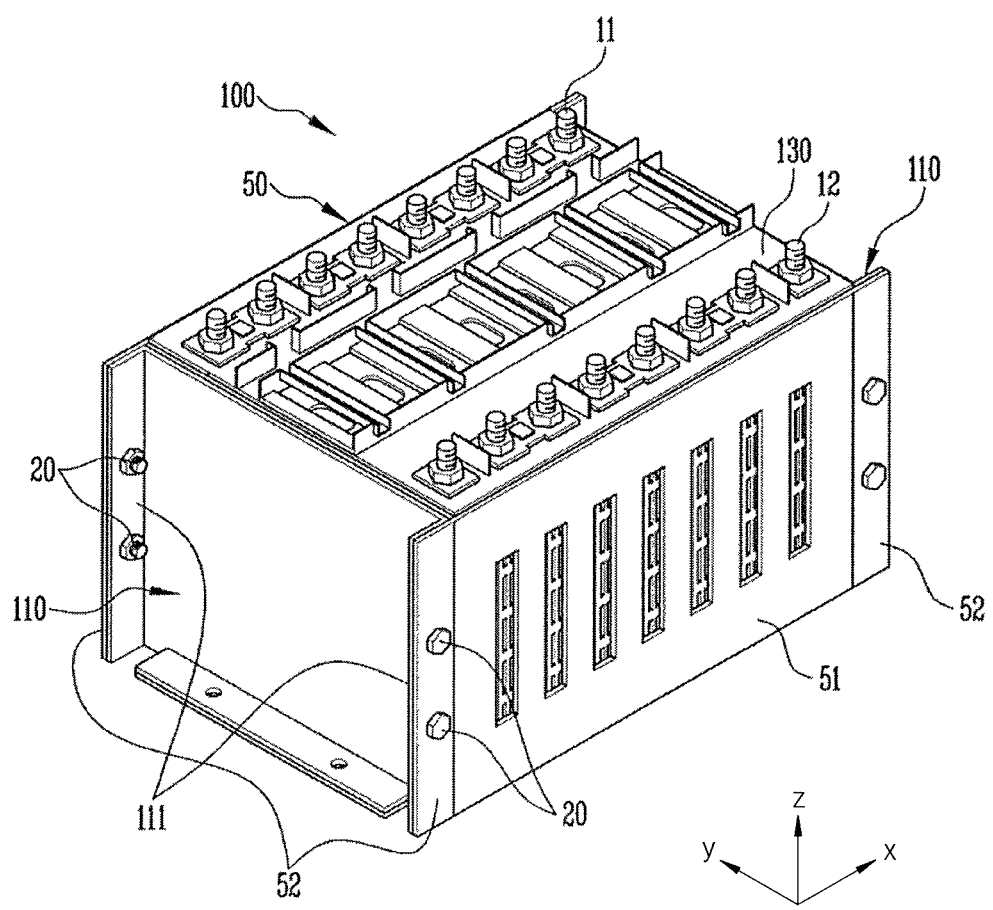
FIG. 1 illustrates a coupled perspective view showing a battery module according to an embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element or "between" two elements, it can be directly connected to the other element or be between the two elements, or intervening elements may be interposed therebetween. Hereinafter, like reference numerals refer to like elements. In the drawings, the thickness or size of layers may be exaggerated for clarity and not necessarily drawn to scale.

Figure 2:
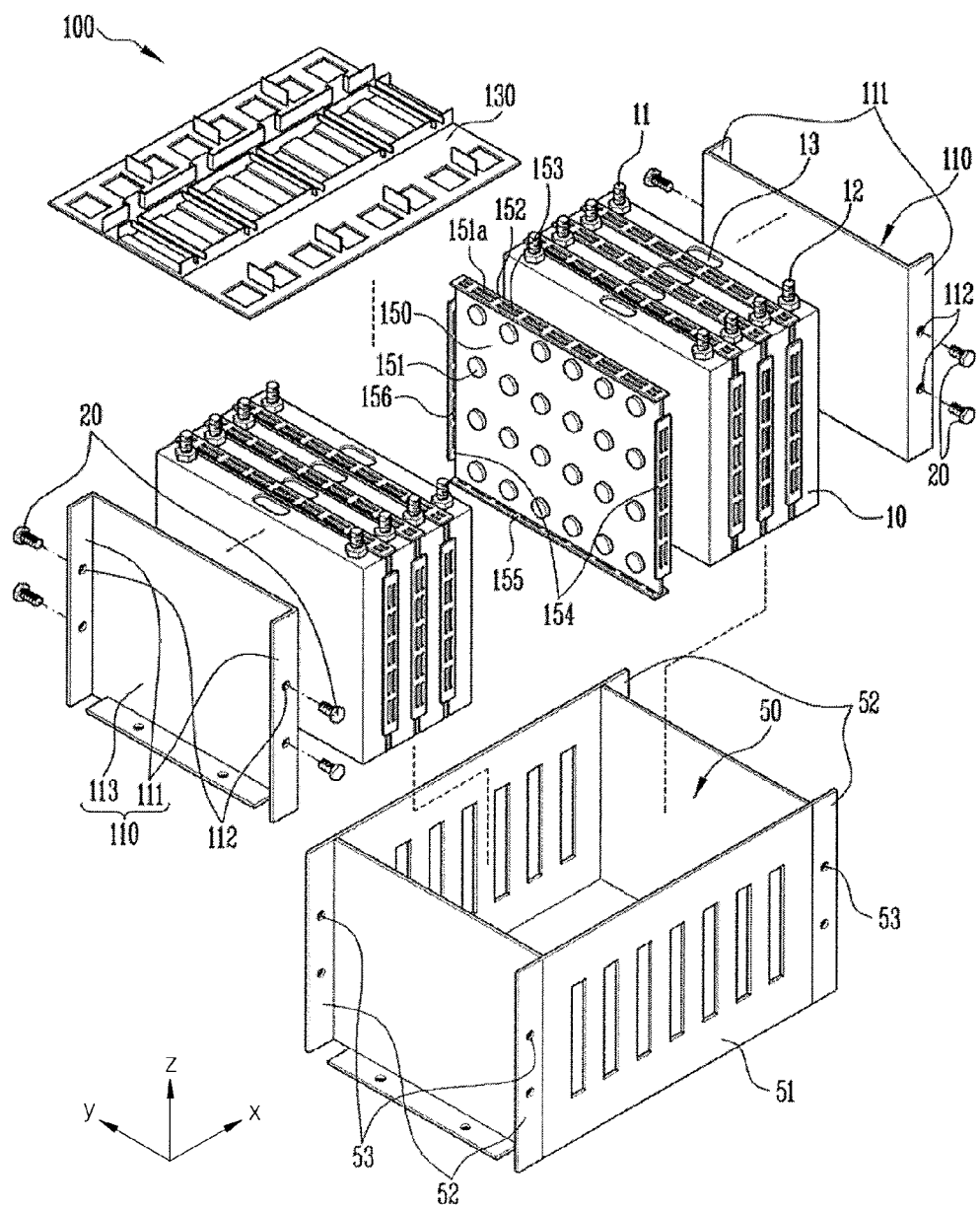
FIG. 2 illustrates an exploded perspective view showing the battery module of FIG. 1.

FIG. 1 is a coupled perspective view showing a battery module according to an embodiment of the present disclosure. FIG. 2 is an exploded perspective view showing the battery module of FIG. 1.

Referring to FIGS. 1 and 2, in a battery module 100 according to the embodiment of the present disclosure, a plurality of battery cells 10 arranged in one direction are accommodated in a, e.g., box-shaped, housing 50, and spacers 150 are located between the respective battery cells 10. Also, a pair of end plates 110 may be respectively disposed at both outer end portions of the housing 50 in the arrangement direction of the plurality of battery cells 10. In addition, a top plate 130 may be located over the plurality of battery cells 10. Holes, through which the plurality of battery cells 10, terminal portions 11 and 12, and vent portions 13 are exposed, may be formed in the top plate 130.

Each of the spacers 150 respectively located among the plurality of battery cells 10, e.g., one spacer 150 may be positioned between two adjacent battery cells 10, may include an upper flange portion 152 formed along an upper end portion of the spacer 150, and at least one holding groove portion 153 in the upper flange portion 152. In addition, a holding member 131 (see FIG. 3) may be provided on a lower surface of the top plate 130, corresponding to the holding groove portion 153 of the upper flange portion 152. Thus, the holding member 131 formed on the lower surface of the top plate 130 is fastened to the holding groove portion 153 formed in the upper flange portion 152 of the spacer 150, so that the position of the spacer 150 can be firmly fixed, as will be described in more detail below with reference to FIGS. 3-4. Accordingly, even if swelling occurs in the battery cell 10, the battery cell 10 is not separated from its position, so that it is possible to secure a flow path for cooling of the battery cells 10.

As further illustrated in FIG. 2, side flange portions 154 surrounding portions of side surfaces of adjacent battery cells 10 may be provided at both end portions of each spacer 150, respectively. Through-holes 156 are provided in the side flange portion 154, and heat inside the battery module 100 can be discharged to the outside through the through-holes 156. That is, the through-hole 156 may be used as a movement path through which heat emitted from the battery cell 10 is discharged to the outside. Also, a lower flange portion 155 may be formed at a lower portion of the spacer 150. Here, the side flange portion 154 and the lower flange portion 155 may be formed approximately perpendicular to a base portion on which protruding portions 151 are formed.

The housing 50 may be integrally formed, e.g., in a box shape, to surround lower surfaces, both side surfaces, and both end portions of the plurality of battery cells 10. In the housing 50, side plates 51 respectively located at sides surrounding both side surfaces of the battery cells 10 include first extending portions 52 extending from both end portions thereof in the arrangement direction of the battery cells 10. In addition, at least one first fastening hole 53 is formed in the first extending portion 52. The first fastening hole 53 is a portion fastened to the end plate 110 later.

Each of the pair of end plates 110 respectively located at both the end portions of the housing 50 may include a body portion 113 facing an end portion of the plurality of battery cell 10, and second extending portions 111 respectively bending from both sides of the body portion 113 to face the first extending portions 52 of the side plates 51. Here, a second fastening hole 112 is formed at a position corresponding to the first fastening hole 53 of the first extending portion 52 in the second extending portion 111. The first fastening hole 53 of the side plate 51 and the second fastening hole 112 of the end plate 110 may be fastened to each other by using separate fixing members 20. For example, the fixing member 20 may include a screw.

Each of the plurality of battery cells 10 arranged in the one direction between the pair of end plates 110 may be manufactured by accommodating an electrode assembly and an electrolyte in a case, and then sealing the case with a cap plate. The cap plate is provided with a positive electrode terminal 11, a negative electrode terminal 12, and a vent portion provided between the terminals 11 and 12. The electrode assembly may include a positive electrode plate, a negative electrode plate, and a separator interposed between the electrode plates.

The housing 50 may accommodate the plurality of battery cells 10 arranged in the one direction in a partitioned space thereof. In this instance, the battery cells 10 are arranged in parallel such that their wide front surfaces are opposite to each other. In addition, the positive and negative electrode terminals 11 and 12 of two adjacent battery cells 10 may be electrically connected to each other through a bus-bar. Holes, through which the positive electrode terminal 11 and the negative electrode terminal 12 pass, may be provided in the bus-bar. The bus-bar, through which the terminals 11 and 12 are connected to each other by passing, may be fixed by members, e.g., nuts.

The pair of end plates 110 are disposed to come in surface contact with portions of the housing 50, located at both the end portions of the plurality of battery cells 10, respectively. Thus, the pair of end plates 110 can pressurize, e.g., push from opposite sides, the plurality of battery cells 10 toward each other, e.g., toward an internal space of the housing 50. In the plurality of battery cells 10 supported by the pair of end plates 110, the positive and negative electrode terminals 11 and 12 are alternately arranged, so that the plurality of battery cells 10 can be connected in series to each other.

First fixing holes for coupling the end plates 110 to the housing 50 are formed at both ends of the battery module 100 at lower end portions of the end plates 110, and second fixing holes are formed in the housing 50 corresponding to the first fixing holes. Accordingly, a fastening member such as a bolt or stud passes through the first and second fixing holes, so that the battery module 100 can be fixed in the housing 50.

Figure 3:
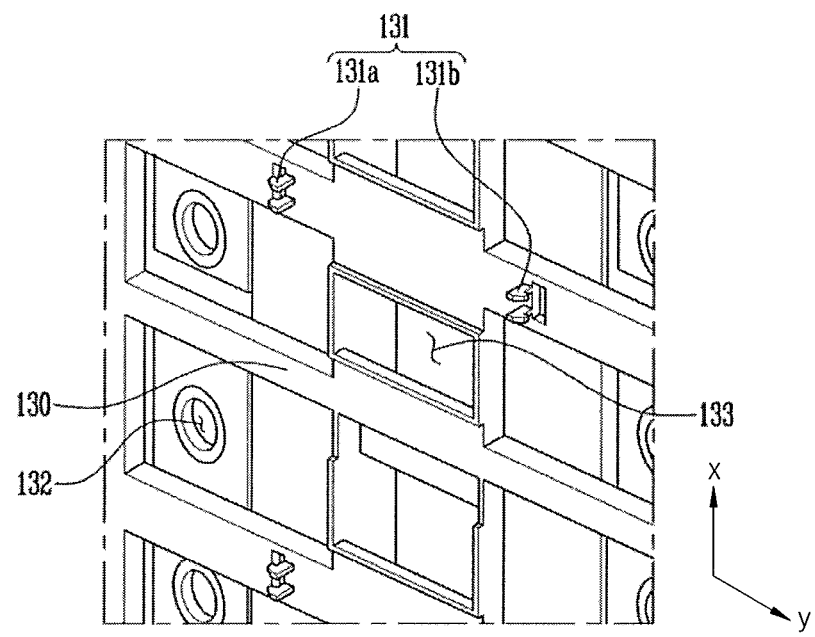
FIG. 3 illustrates a perspective view showing a lower surface of a top plate according to the embodiment of the present disclosure.
Figure 4:
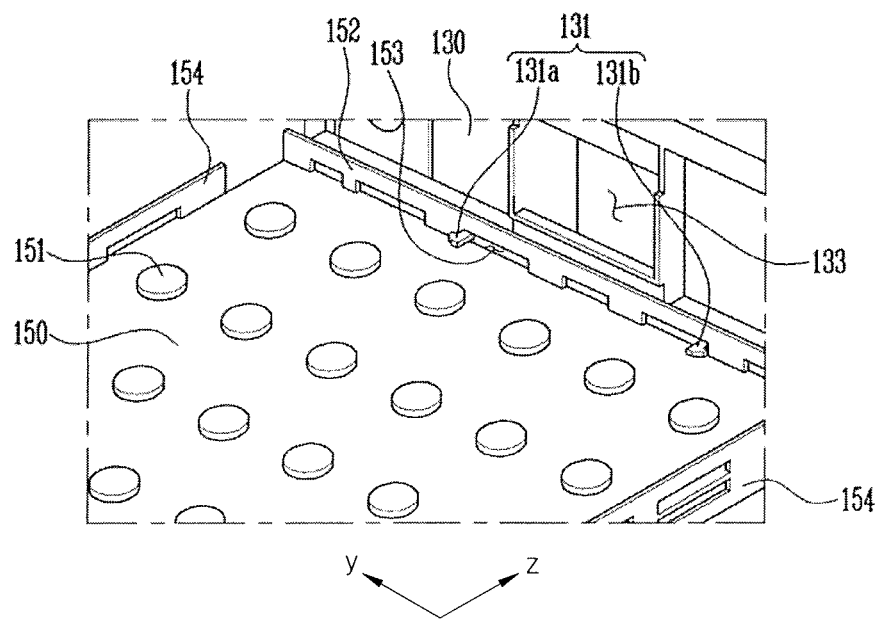
FIG. 4 illustrates a perspective view showing a state in which the top plate of FIG. 3 and a spacer are coupled to each other.

FIG. 3 is a perspective view showing a lower surface of the top plate 130 according to the embodiment of the present disclosure. FIG. 4 is a perspective view showing a state in which the top plate 130 and the spacer 150 are coupled to each other.

In a battery module, the lifespan of a battery cell may be reduced due to heat generated when the battery cell is charged or discharged. Therefore, according to example embodiments, in order to discharge heat generated in the battery cell 10 of the battery module 100, the plurality of battery cells 10 are arranged to be spaced apart from each other at a predetermined distance, rather than being adhered closely to each other, and the spacers 150 having flow paths are disposed between the respective battery cells 10. As air moves through the flow paths formed in the spacers 150, the battery module 100 can be cooled.

However, if swelling were to occur in the battery cell 10, the arrangement of the spacers 150 and the battery cells 10 could be distorted, e.g., misaligned. As a result, a flow path for discharging heat generated from the battery module 100 could be distorted, thereby failing to properly discharge heat from the battery module 100 to the outside.

Therefore, referring to FIG. 2-4, in an embodiment of the present disclosure, at least one holding groove portion 153 is formed in the upper flange portion 152 of the spacer 150, e.g., to extend along the upper end portion of the spacer 150. The holding member 131 on the lower surface of the top plate 130 corresponds to the holding groove portion 153 in the upper flange portion 152 of the spacer 150, so the holding member 131 of the top plate 130 may be fastened to the holding groove portion 153 of the upper flange portion 152 of the space 150. Accordingly, even if swelling occurs in the battery cell 10, the arrangement of the battery cells 10 and the spacers 150 can be firmly fixed inside the housing 50 via the connection between the holding member 131 and the holding groove portion 153. Also, as the arrangement of the battery cells 10 and the spacers 150 is secured inside the housing 50, the flow paths formed in the spacers 150 are be secured, thereby easily cooling the battery module 100.

In detail, an upper end portion of the spacer 150 may be located at a center of the holding groove portion 153 formed in the upper flange portion 152. For example, as illustrated in FIG. 2, the upper flange portion 152 may be centered on the upper end portion of the spacer 150, such that the upper end portion of the spacer 150 is centered with respect to the at least one holding groove portion 153 in the upper flange portion 152 along the x-axis. For example, a plurality of holding groove portions 153 spaced apart from each other along the y-axis may be formed through the upper flange portion 152 on each side of the spacer 150, such that a predetermined number of holding groove portions 153 may overhang each side of the spacer 150 along the x-axis. It is noted that while a plurality of holding groove portions 153 are illustrated on each side of the spacer in FIGS. 2 and 4, embodiments are not limited thereto.

Further, referring to FIGS. 2-3, the holding member 131 formed on the lower surface of the top plate 130 faces the interior of the housing 50 and the upper flange portion 152 of the spacer 150. As illustrated in FIG. 3, the holding member 131 may be formed with at least one pair of hook members spaced apart from each other along the x-axis and extending toward the spacer 150 along the z-axis. As such, referring to FIGS. 3-4, the at least one pair of hook members of the holding member 131 extends along the z-axis through the at least one holding groove portion 153 in the upper flange portion 152 to have the upper end portion of the spacer 150 fit therebetween, e.g., such that each hook member is fastened to the at least one holding groove portion 153 on a different side of the spacer 150 (FIG. 4). For example, as illustrated in FIG. 3, the holding member 131 of the top plate 130 may extend through and be fastened to the holding groove portions 153 of one spacer 150 with two pairs of hook members. The two pairs of hook members may be formed to be spaced apart from each other at a predetermined distance along the upper end portion of the spacer 150, e.g., along the y-axis.

For example, as illustrated in FIG. 3, the holding member 131 may include a first pair of hook members 131a and a second pair of hook members 131b that face opposite directions, and are spaced apart from each other along the y-axis. That is, the first pair of hook members 131a may be formed toward a first side surface of the battery cell 10, e.g., may face a negative direction of the y-axis, and the second pair of hook members 131b may be formed toward a second side surface of the battery cell 10, e.g., may face a positive direction of the y-axis. Accordingly, the holding member 131 of the top plate 130 can be easily fastened to the holding groove portion 153 of the spacer 150 in a state in which the battery cells 10 and the spacers 150 are accommodated inside the housing 50.

As such, it is possible to secure a flow path of the battery module 100 through a simple structure in which the hook-shaped holding member 131 of the top plate 130 is fastened to the holding groove portion 153 of the spacer 150. That is, the top plate 130 according to the embodiment of the present disclosure can not only protect the bus-bars, wires, the battery cells 10, and the like but also fix the spacers 150.

Accordingly, it is possible to prevent each spacer 150 from blocking a flow path due to swelling caused by degradation or over-discharge of the battery cell 10. In addition, the upward/downward support force of the battery cells 10 is increased, so that it is possible to prevent an IR increase in the battery module 100. Further, as the battery module 100 is cooled by a constant airflow, the lifespan of the battery module 100 can be increased, and battery cell 10 imbalance can be prevented. It is further noted with respect to FIGS. 3-4, that reference numeral 132 designates a hole through which the positive or negative electrode terminals 11 or 12 of the battery cell 10 passes, and reference numeral 133 designates a hole formed in an area corresponding to the vent portion 13 of the battery cell 10.

Figure 5:
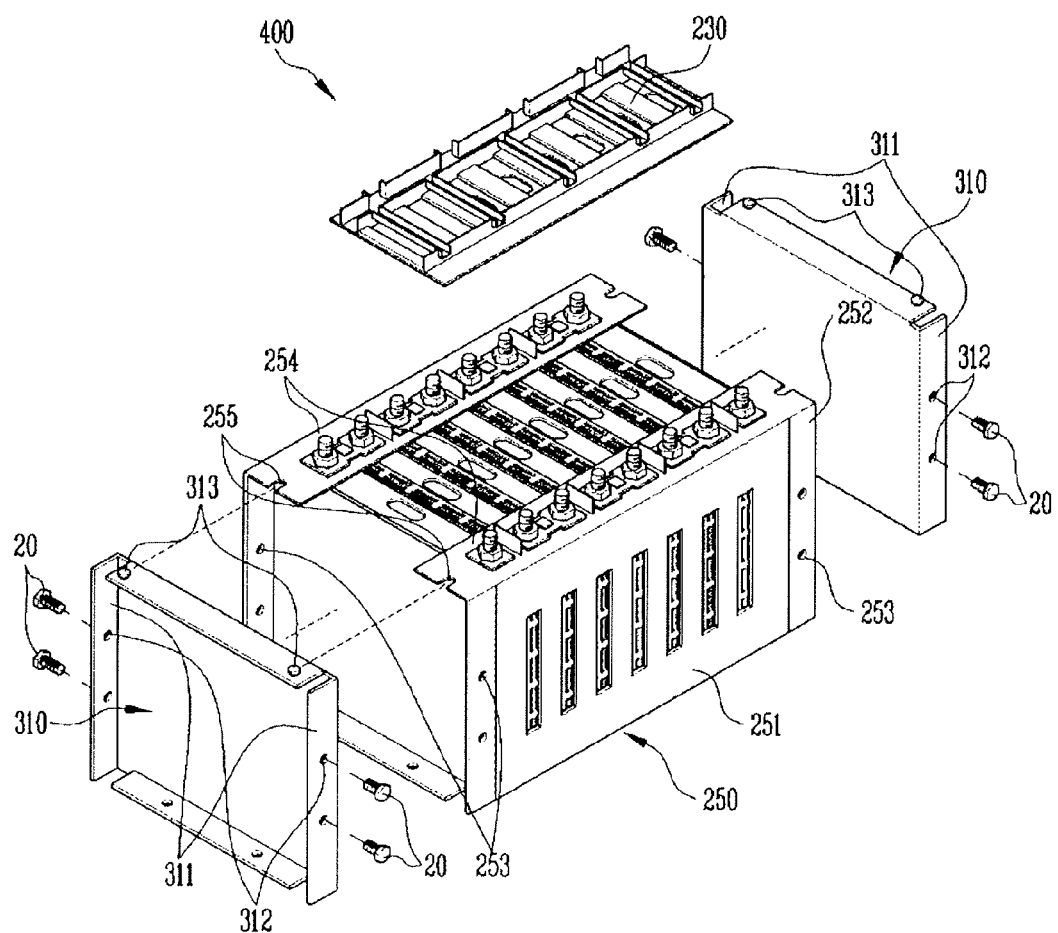
FIG. 5 illustrates an exploded perspective view showing a battery module according to another embodiment of the present disclosure.
Figure 6:
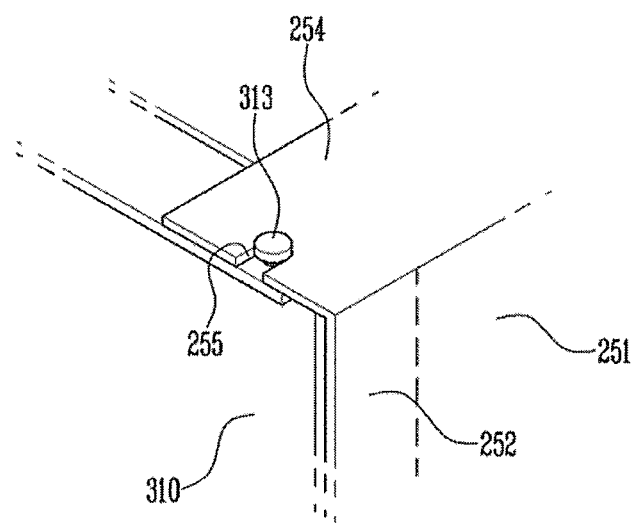
FIG. 6 illustrates an enlarged perspective view showing a state in which a protruding portion of an end plate is coupled to an accommodating groove portion of a bending portion of a side plate in FIG. 5.

FIG. 5 is an exploded perspective view showing a battery module according to another embodiment of the present disclosure. FIG. 6 is an enlarged perspective view showing a state in which a protruding portion of an end plate is coupled to an accommodating groove portion of a bending portion of a side plate in FIG. 5.

Referring to FIGS. 5 and 6, in a battery module 400 according to an embodiment of the present disclosure, a housing 250 surrounds both side surfaces, a lower surface, and both end portions of the plurality of battery cells 10, and includes side plates 251 respectively surrounding both the surfaces of the plurality of battery cells 10. The side plate 251 includes first extending portions 252 respectively extending from both end portions of the side plate 251 in the arrangement direction of the plurality of battery cells 10, and a bending portion 254 bending in a predetermined length toward an upper surface of the plurality of battery cells 10.

An accommodating groove portion 255 is formed at an end portion of the bending portion 254 located in an area bending toward an upper surface of the battery cell 10 from the first extending portion 252. Here, the accommodating groove portion 255 may be formed in the shape of a groove recessed in a predetermined depth toward the battery cell 10 in the arrangement direction of the plurality of battery cells 10. In addition, a protruding portion 313 is formed on an upper surface of an end plate 310, corresponding to the accommodating groove portion 255.

Generally, in a battery module, when end plates are fastened to both end portions of the housing, respectively, distortion may occur in the end plates due to swelling caused by degradation of the battery cells. Accordingly, the end plates may require application of pressure with a constant force when swelling occurs in the battery cells in order to prevent the pressurized force from being dispersed and to prolong the lifespan of the battery cell.

In an embodiment of the present disclosure, the protruding portion 313 formed on the upper surface of the end plate 310 is fastened to the accommodating groove portion 255 formed at the end portion of the bending portion 254 of the side plate 251, so that the plurality of battery cells 10 can be pressurized with a constant force. Accordingly, it is possible to not only prevent an increase in internal resistance due to upward/downward distortion between the plurality of battery cells 10 but also to prevent battery cell imbalance.

The end plates 310 are fastened to the housing 250 in a state in which the plurality of battery cells 10 are accommodated in the housing 250 and then pressurized. In this state, the side plate 251 of the housing 250 includes the bending portion 254 bending to the upper surface of the battery cell 10. In addition, the accommodating groove portion 255 is formed at the end portion of the bending portion 254, and the protruding portion 313 formed on the upper surface of the end plate 310 is fastened to the accommodating groove portion 255.

In this case, the protruding portion 313 may be formed in a size smaller than or equal to that of the accommodating groove portion 255, to be easily inserted into the accommodating groove portion 255. In addition, an upper end portion of the protruding portion 313 may be formed greater than the accommodating groove portion 255, not to be separated from the accommodating groove portion 255 after the protruding portion 313 is fasted to the accommodating groove portion 255.

As such, a fastening structure between the accommodating groove portion 255 of the side plate 251 and the protruding portion 313 of the end plate 310 can be applied so as to prevent the separation of the battery cell 10. The fastening structure can guide an assembler to more easily find a reference of position when the battery module 400 is assembled, and accordingly, it is possible to prevent misassembly of the battery module 400.

Also, terminal portions are not exposed by the bending portion of the side plate 251, so that it is possible to prevent the terminal portions from being short-circuited in a process of assembling an additional device or the battery module. Also, the assembly process of the battery module is simple, and thus the manufacturing cost of the battery module can be reduced. In this case, a top plate 230 may be formed to cover only vent portions except the terminal portions of the plurality of battery cells 10.

Meanwhile, at least one first fastening hole 253 is formed in the first extending portion 252 of the side plate 251. The first fastening hole 253 and a second fastening hole 312 formed in a second extending portion 311 of the end plate 310 may be fastened to each other by a fixing member 20. This will be described in more detail below with reference to FIG. 7.

The top plate 230 is located on the upper surfaces of the plurality of battery cells 10 except the bending portions 254. As described previously with reference to FIGS. 1-4, the battery module 400 may further include a holding member formed on a lower surface of the top plate 230 to be fastened to a holding groove portion formed in an upper flange of a spacer, so that the position of the spacer can be firmly fixed.

Figure 7:
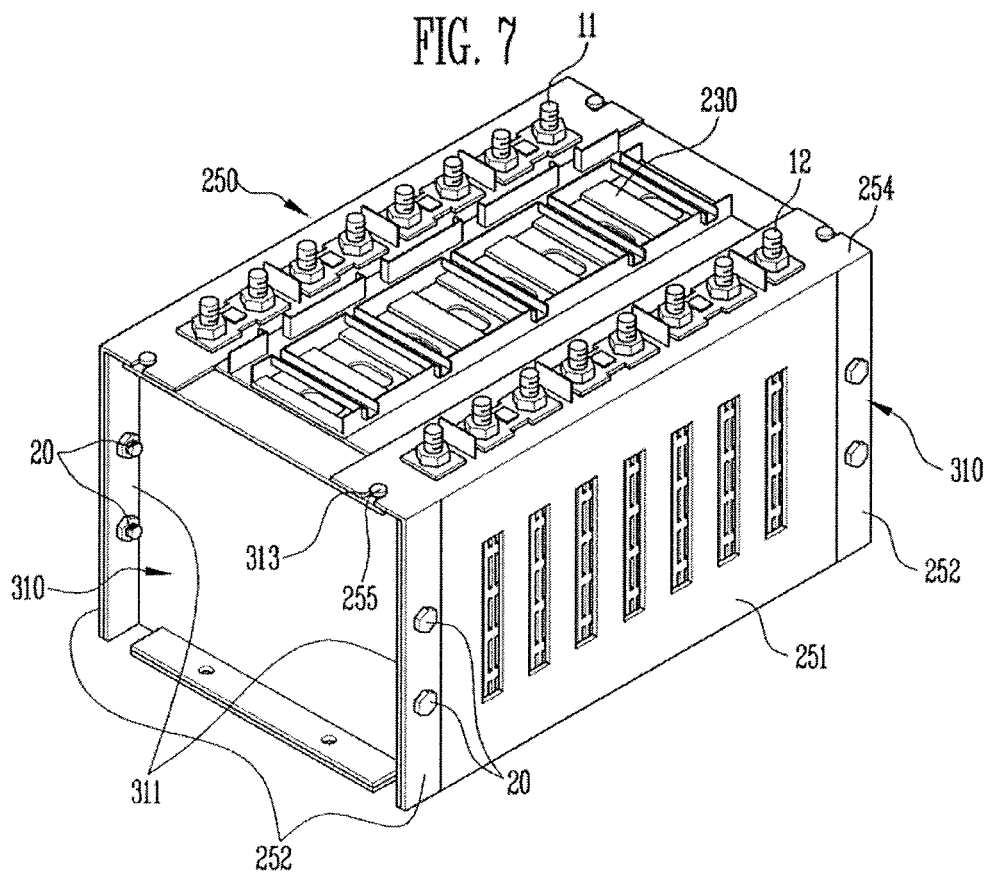
FIG. 7 illustrates a perspective view showing a state in which the side and end plates are fastened to each other.

FIG. 7 is a perspective view showing a state in which the side plate 251 and end plate 310 are fastened to each other.

Referring to FIG. 7, after the protruding portion 313 of the end plate 310 is inserted and fastened to the accommodating groove portion 255 of the side plate 251, the first extending portion 252 of the side plate 251 and the second extending portion 311 of the end plate 310 are fastened to each other so as to reinforce the fastening force between the side and end plates 251 and 310. The at least one first fastening hole 253 (see FIG. 5) is formed in the first extending portion of the side plate 251. In addition, the second extending portion 311 corresponding to the first extending portion 252 of the side plate 251 is formed at the end plate 310. Here, the second fastening hole 312 (see FIG. 5) is formed at a position corresponding to the first fastening hole 253 of the first extending portion 252 in the second extending portion 311. Accordingly, the first fastening hole 253 of the side plate 251 and the second fastening hole 312 of the end plate 310 can be fastened to each other by using the separate fixing member 20. Here, the fixing member 20 may include a screw.

By way of summation and review, embodiments provide a battery module in which a holding groove portion formed at an upper flange portion of a spacer located between battery cells is fastened to a holding member of a top plate, so that it is possible to prevent the battery cell from being separated inside a housing. Embodiments also provide a battery module in which an accommodating groove portion of a bending portion extending to upper surfaces of battery cells from a side plate is fastened to a protruding portion of an end plate, so that the battery cells can be pressurized with a constant force.

That is, according to the present disclosure, the battery cell is prevented from being separated inside the housing, so that it is possible to secure a flow path for cooling the battery cells. Thus, it is possible to not only prolong the lifespan of the battery module but also to prevent battery cell imbalance. Also, according to the present disclosure, the battery cells can be pressurized with a constant force, thereby preventing an increase in internal resistance due to upward/downward distortion between the battery cells.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
a plurality of battery cells arranged in a first direction;
spacers respectively located among the plurality of battery cells, the spacers including upper end portions and upper flange portions along the upper end portions;
a housing accommodating the plurality of battery cells and the spacers;
a pair of end plates at respective opposite ends in the arrangement direction of the plurality of battery cells, the pair of end plates being outside of the housing; and
a top plate over the plurality of battery cells, the top plate including a lower surface and at least one holding member on the lower surface, the at least one holding member on the lower surface corresponding to at least one holding groove portion in the upper flange portions of the spacers, wherein:
an upper end portion of at least one spacer is aligned with a center of the at least one holding groove portion,
the at least one holding member includes at least one pair of hook members spaced apart from each other in the first direction, the at least one pair of hook members extends through the at least one holding groove portion, the upper end portion of the spacer is positioned between the hook members, and each hook member of the at least one pair of hook members is fastened to the at least one holding groove portion on a different side of the spacer.

2. The battery module as claimed in claim 1, wherein the at least one pair of hook members includes at least two pairs of hook members spaced apart from each other at a predetermined distance along the upper end portion of the spacer, the at least two pairs of hook members facing in different directions from each other.

3. The battery module as claimed in claim 2, wherein a first pair of the at least two pairs of hook members faces toward a first side surface of the battery cells, and a second pair of the at least two pairs of hook members faces toward a second side surface of the battery cells.

4. The battery module as claimed in claim 1, wherein the housing includes:

side plates surrounding opposite side surfaces of the battery cells;

first extending portions extending from two end portions of the side plates in the arrangement direction of the battery cells; and at least one bending portion bending toward upper surfaces of the battery cells.

5. The battery module as claimed in claim 4, wherein the at least one bending portion includes an accommodating groove portion at an end portion thereof.

6. The battery module as claimed in claim 5, wherein at least one of the end plates includes an upper surface with a protruding portion on the upper surface, the protruding portion corresponding to the accommodating groove portion.

7. The battery module as claimed in claim 4, wherein each of the first extending portions includes at least one first fastening hole.

8. The battery module as claimed in claim 7, wherein each of the end plates includes a body portion facing an end portion of the housing and a second extending portion bending from the body portion to face the first extending portion, the second extending portion including at least one second fastening hole, and the first fastening hole and the second fastening hole being fastened to each other via a fixing member.

9. The battery module as claimed in claim 8, wherein the fixing member is a screw.

10. The battery module as claimed in claim 1, wherein each spacer includes side flange portions surrounding portions of side surfaces of adjacent battery cells.

11. The battery module as claimed in claim 10, wherein each side flange portion includes at least one through-hole to define a flow path between the adjacent battery cells, so that air moves through the through-hole.

* * * * *